United States Patent [19]

Inami et al.

[11] Patent Number: 4,489,353

[45] Date of Patent: Dec. 18, 1984

[54] MAXIMUM OUTPUT LEVEL AUTOMATIC MEASURING APPARATUS

[75] Inventors: Mamoru Inami, Yokohama; Zenju Ohtsuki, Tokyo; Yoshiaki Tanaka, Fujisawa, all of Japan

[73] Assignee: Victor Company of Japan, Ltd., Yokohama, Japan

[21] Appl. No.: 434,102

[22] Filed: Oct. 13, 1982

[30] Foreign Application Priority Data

Oct. 15, 1981 [JP] Japan .................. 56-164499
Dec. 2, 1981 [JP] Japan .................. 56-194245
Dec. 2, 1981 [JP] Japan .................. 56-194246

[51] Int. Cl.³ .................. G11B 15/02; G11B 5/02
[52] U.S. Cl. .................. 360/25; 360/68
[58] Field of Search .................. 360/25, 31, 65, 67, 360/68

[56] References Cited

U.S. PATENT DOCUMENTS 4,262,313 4/1981 Mouri .................. 360/25
4,279,005 7/1981 Kitamura et al. .................. 360/65
4,405,953 9/1983 Inomata et al. .................. 360/65

*Primary Examiner*—Vincent P. Canney
*Attorney, Agent, or Firm*—Posnack, Roberts, Cohen & Spiecens

[57] ABSTRACT

A maximum output level automatic measuring apparatus comprises a testing signal generating circuit for generating a plurality of testing signals having different frequencies, by independently varying respective levels of the testing signals, a recording and reproducing circuit for recording the plurality of testing signals from the testing signal generating circuit onto a magnetic recording medium, and reproducing the recorded testing signals, a level detector for detecting reproduced levels of the plurality of testing signals from the recording and reproducing circuit, and a display device for displaying a maximum output level curve according to reproduced levels detected at the level detecting circuit. The level detector detects that reproduced levels of the plurality of testing signals have reached predetermined values preset with respect to the respective testing signals. The display device comprises a display screen having a frequency axis and a level axis, and independently displays the reproduced levels which reached the predetermined values detected by the level detector for each of the frequencies.

11 Claims, 39 Drawing Figures

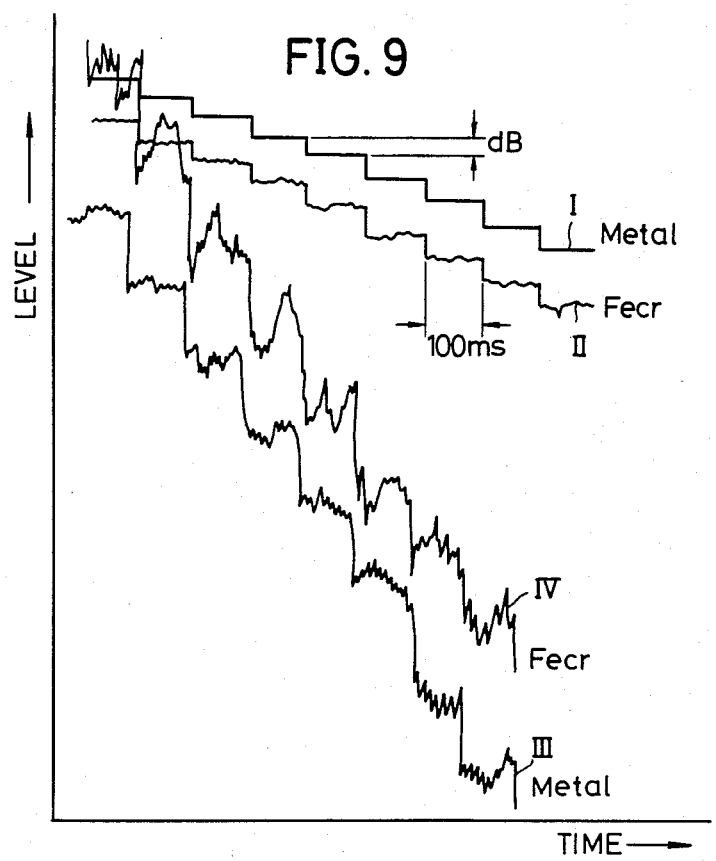
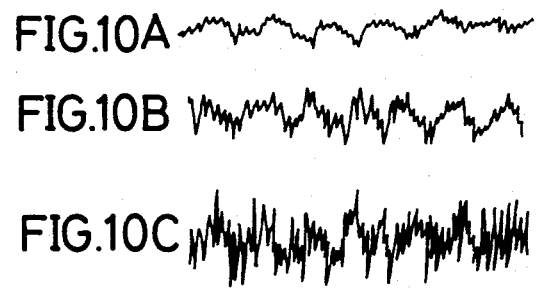
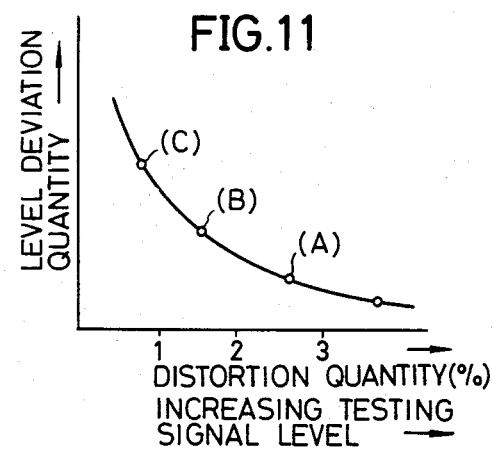

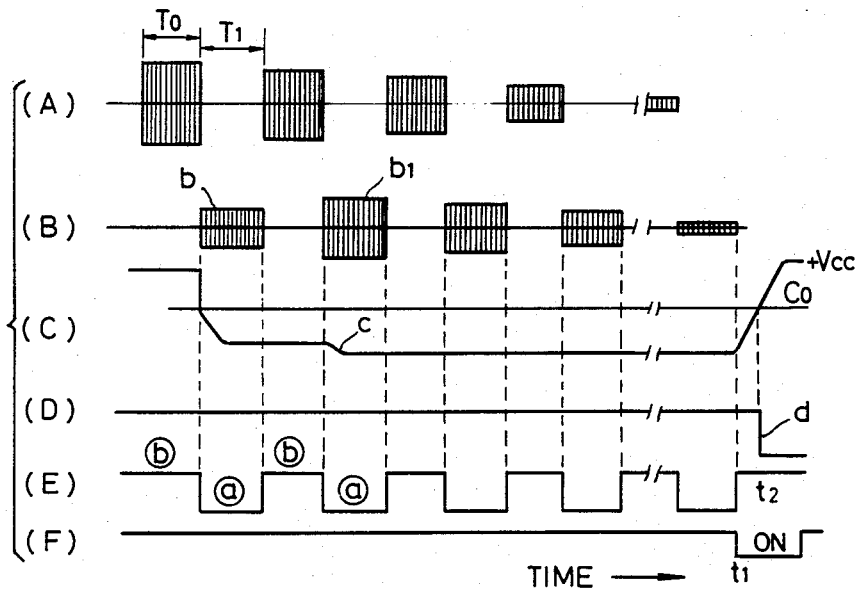
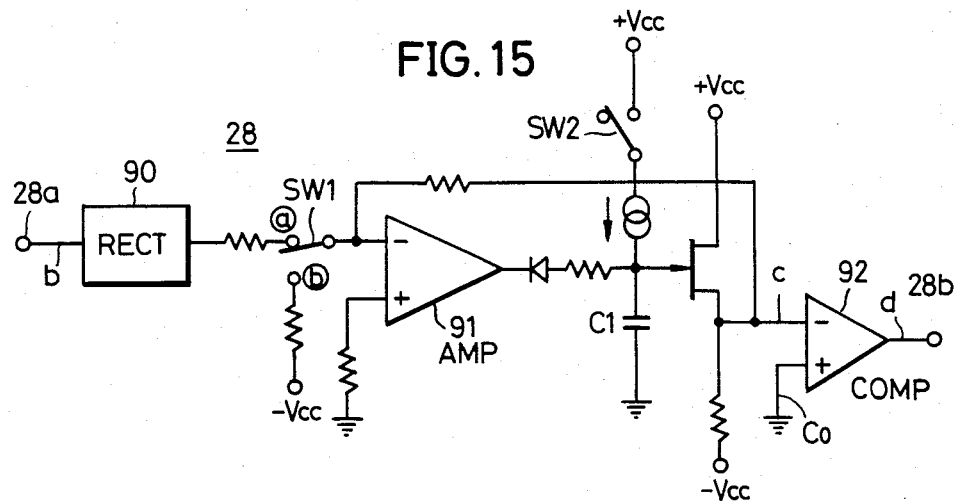

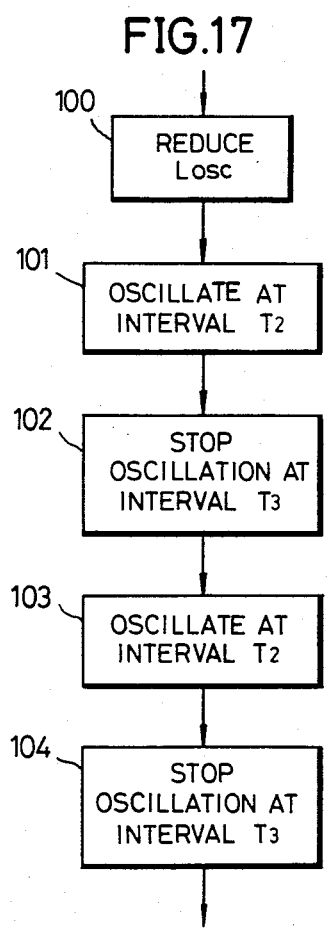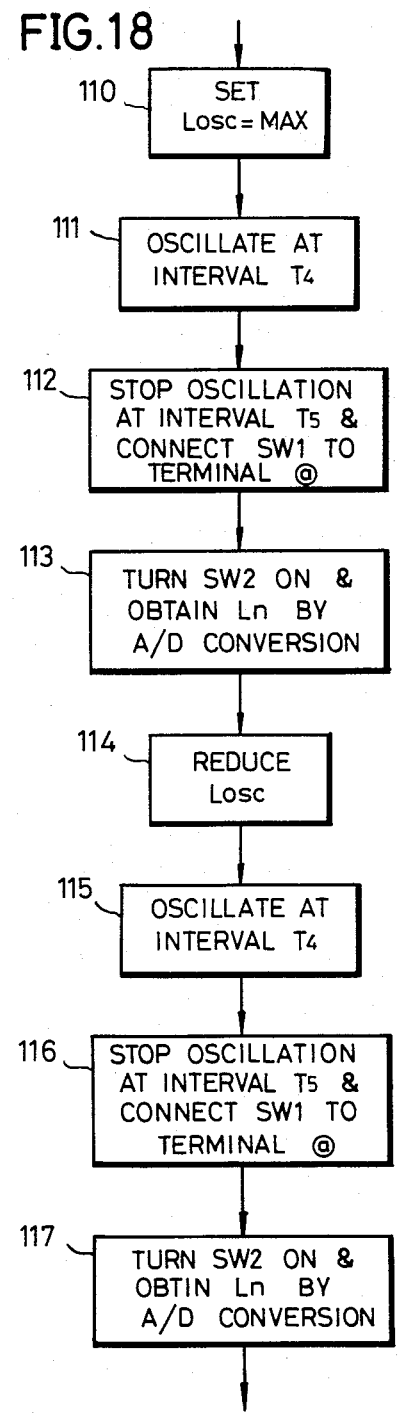

MAXIMUM OUTPUT LEVEL AUTOMATIC MEASURING APPARATUS

BACKGROUND OF THE INVENTION

The present invention generally relates to maximum output level (hereinafter simply referred to as MOL) automatic measuring apparatuses, and more particularly to a MOL automatic measuring apparatus in a tape recorder, capable of automatically measuring the most suitable MOL of the tape which is used.

If cassette tapes presently being marketed are generally classified, there are four types of cassette tapes, mainly, the normal type, chrome type, ferrichrome type, and the metal type cassette tapes. The magnetic characteristic of the same type of cassette tape slightly differs according to the manufacturer. In order to carry out a most suitable recording, it is necessary to make adjustments so that input signals in each of the frequency bands do not exceed the MOL, according to the MOL characteristic and the like of the tape which is used.

Conventionally, the manufacturers printed the MOL curve on a label of the cassette halves, to show the MOL value of that particular tape. In addition, the user mounted a panel which is printed with the MOL curve of the tape which is used upon recording, on the front surfaces of a display part of a spectrum analyzer.

However, the MOL is inconsistent even among the same type of tape of the same manufacturer, and also differs according to the frequency of usage of the recording head of the cassette deck used. Accordingly, the above conventional method was disadvantageous in that it was not possible to obtain a most suitable MOL for the tape and the cassette deck used.

SUMMARY OF THE INVENTION

Accordingly, it is a general object of the present invention to provide a novel and useful MOL automatic measuring apparatus in which the above described disadvantages have been overcome.

Another and more specific object of the present invention is to provide a MOL automatic measuring apparatus which records a plurality of testing signals having different frequencies on a tape which is used, reproduces the recorded test signals to detect the most suitable MOL for that tape, and displays the MOL curve on a display device. According to the apparatus of the present invention, it is possible to easily observe the most suitable MOL curve corresponding to each one of the tapes used, to obtain the most suitable recording condition upon recording.

Still another object of the present invention is to provide a MOL automatic measuring apparatus which records and reproduces the plurality of testing signals having different frequencies, by varying the testing signal levels from high-level to low level, to measure the MOL. According to the apparatus of the present invention, it is possible to detect a 3% distortion output level within a short period of time with high accuracy.

Another object of the present invention is to provide a MOL automatic measuring apparatus which records and reproduces the plurality of testing signals having different frequencies, by intermittently varying the testing signal levels, to measure the MOL. According to the apparatus of the present invention, the MOL can be measured with small leakage of the recorded signal with respect to the reproduced signal, especially when applied to an apparatus which carries out recording and reproduction by a combination type head.

Other objects and further features of the present invention will be apparent from the following detailed description when read in conjunction with the accompanying drawings.

BRIEF DESCRIPTION OF THE DRAWINGS

FIG. 9 is a graph for explaining level deviation in the reproduced output of the testing signal and the 3% distortion reproduced output level;

FIGS. 10A, 10B and 10C are graphs respectively showing level deviation quantities in the graph shown in FIG. 9;

FIG. 11 is a graph showing a distortion versus level deviation quantity characteristic;

FIGS. 14(A) through 14(F) are graphs respectively showing signal waveforms for explaining the operation of the embodiment of the apparatus according to the present invention;

FIG. 15 is a concrete circuit diagram showing an analog-to-digital converter shown in FIG. 1;

FIG. 17 is a flowchart for explaining the operation of the apparatus described in conjunction with FIGS. 16(A) through 16(E);

FIG. 18 is a flowchart for explaining the operation of still another embodiment of a MOL automatic measuring apparatus according to the present invention;

DETAILED DESCRIPTION

Figure 1:
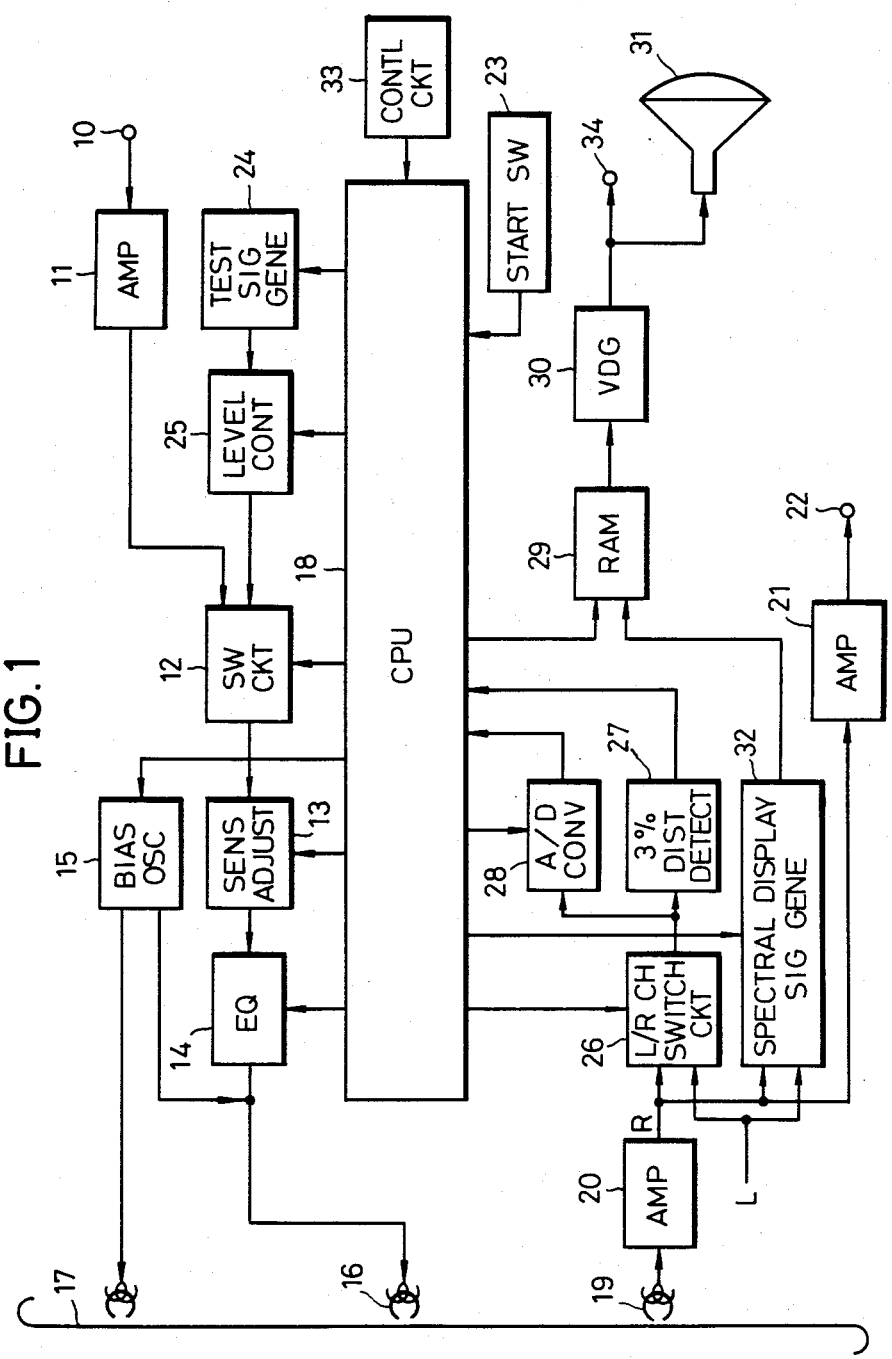
FIG. 1 is a systematic block diagram showing a tape recorder applied with an embodiment of a MOL automatic measuring apparatus according to the present invention.

First, description will be given with respect to general recording and reproduction, by referring to FIG. 1. In FIG. 1, an incoming audio signal is applied to an input terminal 10, and passed through a line amplifier 11 and a switching circuit 12. An output of the switching circuit 12 is supplied to a sensitivity adjustor 13 wherein a characteristic is preset, and adjusted of the sensitivity. An output signal of this sensitivity adjustor 13 is supplied to a frequency characteristic adjustor (equalizer) 14, and adjusted of the frequency characteristic. Further, an output of the equalizer 14 is multiplexed with a bias current from a bias oscillator 15 in which a recording bias current is preset, and supplied to a recording head 16 and recorded onto a magnetic tape 17. The sensitivity adjustor 13, equalizer 14, and bias collector 15 are respectively controlled by control signals from a central processing unit (CPU) 18. Accordingly, signals to be recorded are recorded in a most suitable state through the adjustments at the above circuits.

Upon reproduction, a signal reproduced from the tape 17 by a reproducing head 19 is obtained at an output terminal 22, through a reproducing amplifier 20 and a line amplifier 21.

Among types of tape, there are metal tapes, chrome tapes, ferrichrome tapes, normal tapes, and the like. The magnetic characteristic of each of these types of tape respectively differ. Hence, in order to carry out a most suitable recording with respect to the tape being used, the MOL must be measured by using a testing signal for each of the tapes, and carry out the recording by adjusting the level so that the level does not exceed this MOL for each of the frequency bands of the input signal.

Figure 2:
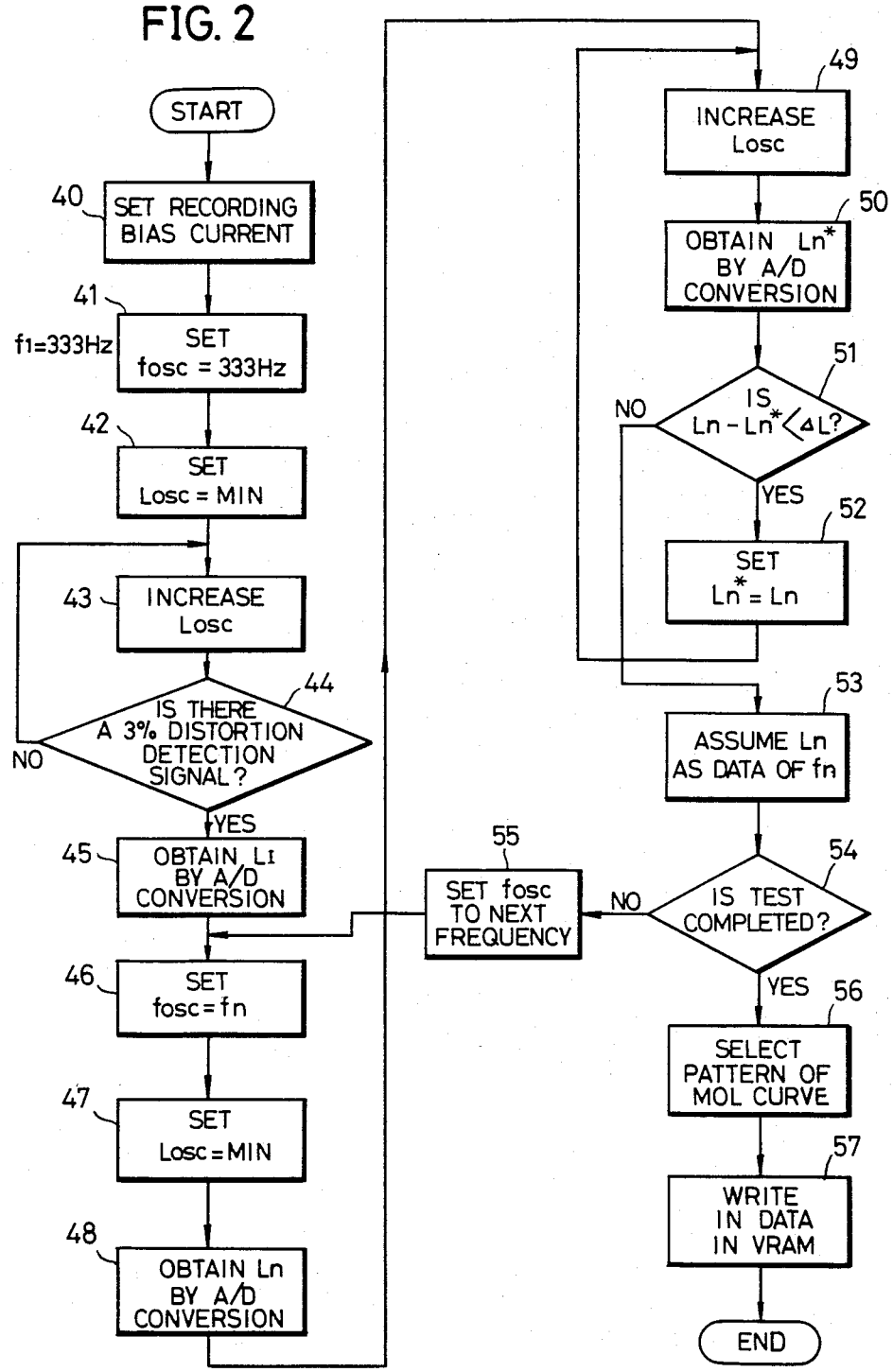
FIG. 2 is a flowchart for explaining the operation of the embodiment of the apparatus according to the present invention.
Figure 3:
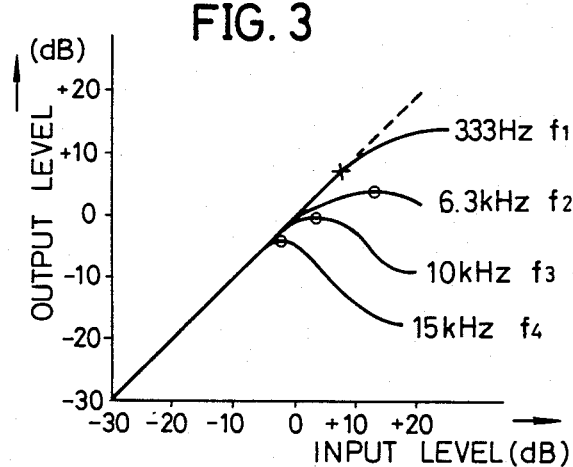
FIG. 3 is a graph showing an input level versus output level characteristic when obtaining the MOL of a testing signal by the apparatus according to the present invention.

Description will now be given by also referring to the flowchart shown in FIG. 2. When a start switch 23 is manipulated, the bias oscillator 15 is operated by a control signal from the CPU 18. The bias oscillator 15 generates a bias current most suitable for the tape being used at a step 40, and the bias current is accordingly set. Next, a testing signal generator 24 generates a first testing signal $f_1$ having a frequency of 33 Hz, at a step 41. This first testing signal $f_1$ is supplied to a level control circuit 25. The output level of the level control circuit 25 is controlled by a control signal from the CPU 18. Hence, first testing signal $f_1$ is converted into a signal in which the level thereof is set to a minimum such as $-30$ dB at a step 42, and gradually increases in level at a step 43, as shown in FIG. 3. The first testing signal $f_1$ is supplied to a right-channel (R-channel) recording head 16, for example, through the switching circuit 12, sensitivity adjustor 13, and the equalizer 14, and recorded onto a right channel (R-channel) on the tape 17. The first testing signal $f_1$ thus recorded, is reproduced by the R-channel reproducing head 19, and supplied to a 3% distortion detector 27 through the reproducing amplifier 20 and a right-and-left (R/L) channel switching circuit 26.

Figure 4:
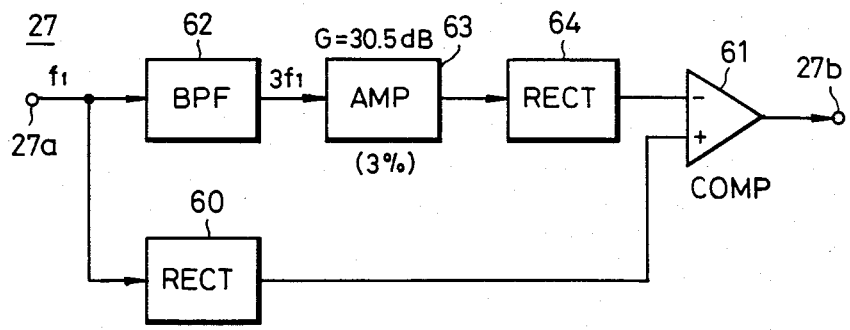
FIG. 4 is a concrete circuit diagram showing a 3% distortion detector in the tape recorder shown in FIG. 1.

The 3% distortion detector 27 has a construction shown in FIG. 4, for example. The first testing signal $f_1$ having a frequency 333 Hz is applied to a terminal 27a and converted into a DC component at a rectifier 60, and then supplied to one input terminal of a comparator 61. On the other hand, the above first testing signal $f_1$ is also supplied to a bandpass filter 62 having a center frequency of 1 kHz, and only the frequency component $3f_1$ (that is, the third order harmonic of the first testing signal $f_1$) is obtained from the bandpass filter 62. The output of the bandpass filter 62 is supplied to an amplifier 63 having a gain of 30.5 dB and amplified of the level, and supplied to the other input terminal of the comparator 61 through a rectifier 64. Level comparison is performed between the DC component of the first testing signal $f_1$ and the DC component of the signal $3f_1$, at the comparator 61, and the existence of the 3% distortion detection signal is detected at a step 44. At a point when the levels of the first testing signal $f_1$ and the signal $3f_1$ become equal, the output detection signal level of the comparator 61 changes to low level from high level, for example, and this output signal is supplied to the CPU 18 through an output terminal 27b. In this case, the gain of the amplifier 63 is set to 30.5 dB (the value at 3% with respect to 0 dB), because an input level point (indicated by a mark "x" in FIG. 3) where the 3% distortion component (third order harmonic $3f_1$) is included within the first testing signal $f_1$ having the frequency 333 Hz is to be obtained. By setting the gain of the amplifier 63 in this manner, a point where a signal obtained from the low-level distortion component $3f_1$ by giving a gain of 30.5 dB and the first testing signal $f_1$ coincide, becomes a point where the output level is distorted by 3% with respect to the input level.

The output detection signal of the comparator 61 is constantly supplied to the CPU 18. The steps 43 and 44 shown in FIG. 2 are repeatedly performed until the low-level output detection signal is obtained from the comparator 61.

When the detection signal is obtained from the comparator 61, an analog-to-digital (A/D) converter 28 is operated by a control signal from the CPU 18. The level of the first testing signal $f_1$ is converted into a digital signal (level $L_1$) at a step 45, and supplied to the CPU 18. When the above digital signal is supplied to the CPU 18, the CPU 18 operates the testing signal generator 24 so as to generate a second testing signal $f_2$ having a frequency 6.3 kHz at a step 46. The second testing signal $f_2$ is similarly converted into a signal which gradually increases in level from $-30$ dB as in the case of the above first testing signal $f_1$, at steps 47 through 50, and recorded onto and reproduced from the tape 17. In this case, measures are taken so that the signal from the 3% distortion detector is neglected. The second testing signal $f_2$ having the frequency 6.3 kHz is supplied to the A/D converter 28 from the switching circuit 26, and further supplied to the CPU 18.

A reproduced input level $L_n^*$ presently being supplied at the step 50 and a reproduced input level $L_n$ supplied at a preceding stage are constantly compared at a step 51. The CPU 18 carries out control so that the level $L_n^*$ is set equal to $L_n$ at a step 52 and the level of the second testing signal $f_2$ is increased again at the step 49, during an interval in which the difference between the levels $L_n^*$ and $L_n$ are less than or equal to a predetermined value $\Delta L$. On the other hand, when the difference between the levels $L_n^*$ and $L_n$ reaches the predetermined value $\Delta L$ (that is, a point indicated by a mark "o" in FIG. 3 where the maximum reproduced output level is obtained), the CPU 18 controls the level control circuit 25 so as to stop increasing the level of the second testing signal $f_2$. The CPU 18 is supplied with a level $L_2$ at this point, and assumes $L_n$ as the data of the second testing signal $f_2$ at a step 53.

Next, discrimination is made at a step 54 to determine whether the test is completed. If the test is not completed, the next frequency is set at a step 55. With respect to third and fourth testing signals $f_3$ and $f_4$ respectively having frequencies 10 kHz and 15 kHz, respective levels are gradually increased at steps 46 through 54. Furthermore, points indicated by marks "o" at the third and fourth testing signals $f_3$ and $f_4$ indicated in FIG. 3 where the output signal level with respect to the input signal becomes maximum, that is, levels $L_3$ and $L_4$, are detected.

MOL curve display signals respectively corresponding to the above levels $L_1$, $L_2$, $L_3$, and $L_4$ are selected at the CPU at a step 56, and supplied and stored in a video random access memory (RAM) 29 at a step 57. A signal from the RAM 29 is supplied to a video display generator (VDG) 30.

Figure 5:
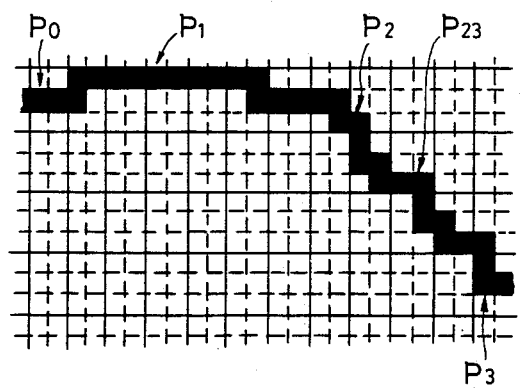
FIG. 5 is a diagram for explaining an embodiment of a display format for the MOL curve by the apparatus according to the present invention.

MOL curve display characters and character (numeral) display characters which will be described hereinafter, are preset at the VDG 30. One character comprises six dots as shown in FIG. 5, for example, and a figure display code signal (comprising a level axis signal and a frequency axis display signal) is produced by the VDG 30 to display the respective dots by use of the MOL curve display character according to the signal from the RAM 29. This figure display code signal is serially obtained in synchronism with the horizontal and vertical synchronizing signals of the video signal, and supplied to a display device 31 such as a cathode ray tube which is driven by each of these synchronizing signals.

Figure 6:
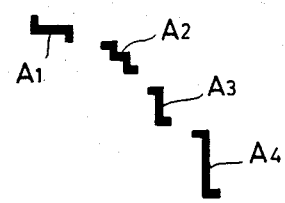
FIG. 6 is a diagram showing the sectioned MOL curve stored in a RAM.

For example, a figure $P_1$ is displayed by a figure display code signal for displaying the MOL curve of the level $L_1$, a figure $P_2$ is displayed by a figure display code for displaying the MOL curve of the level $L_2$, and a figure $P_3$ is displayed by a figure display code for displaying the MOL curve of the level $L_3$. In this case, as shown in FIG. 6, several kinds of information for obtaining a figure such as figures $A_1$ through $A_4$ which are set of the lengths along directions of the level axis and and the frequency axis are stored in the RAM 29. If respective display positions of the levels $L_2$ and $L_3$ are determined, for example, a figure display code signal for filling a part between the display positions of the levels $L_2$ and $L_3$ is obtained.

Figure 7:
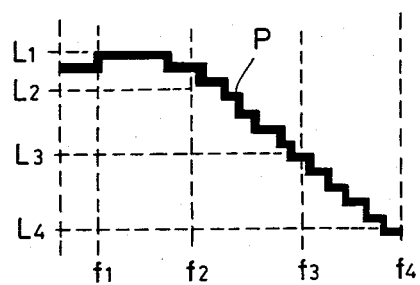
FIG. 7 is a diagram for explaining the whole MOL curve.

Accordingly, a figure $P_{23}$ is obtained, and the MOL curve due to the second testing signal $f_2$ having the frequency 6.3 kHz and the MOL curve due to the third testing signal $f_3$ having the frequency 10 kHz are displayed continuously. Similarly, the MOL curves due to the third testing signal $f_3$ and the fourth testing signal $f_4$ having the frequency 15 kHz are continuously displayed. As a result, a MOL curve P is displayed as a whole as shown in FIG. 7. The slopes of MOL curves for frequencies less than or equal to 333 Hz are substantially the same in any type of tape (approximately a reduction by 2 dB with respect to the level of the first testing signal $f_1$). Hence, a figure $P_0$ shown in FIG. 5 is displayed, for example, by the figure shown in FIG. 6 which is stored in the RAM 29. The MOL curve shown in FIG. 5 is displayed so that adjacent figures among the figures $P_0$, $P_1$, $P_2$, $P_{23}$, and $P_3$ are displayed continuously. Thus, although it is not possible to accurately observe the levels of the continuous parts, it is easy to monitor the curve as a whole.

Figure 8A:
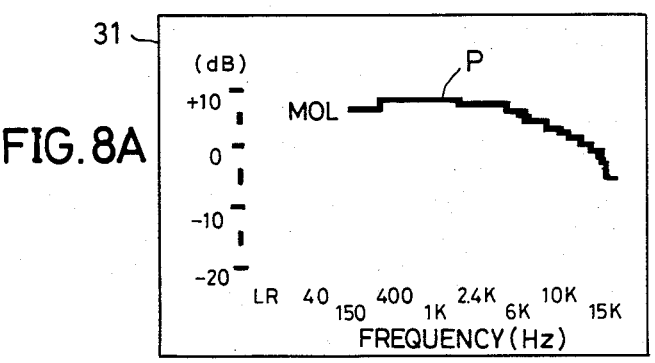
FIGS. 8A and 8B respectively show display pictures obtained by the apparatus according to the present invention.

On the other hand, character information corresponding to Roman numerals, Arabic numerals, signs such as "+", "−", and "( )", and the like, and display position information corresponding to the display position on the screen of the display device 31, and the like, are stored in the RAM 29. The character display signal for displaying such information is serially obtained from the VDG 30 in synchronism with the horizontal synchronizing signal. Thus, as shown in FIG. 8A, characters such as "FREQUENCY" and "MOL", and numerals such as "40", "150", "+10", "−20", and the like, are displayed at predetermined positions at the display device 31.

On the other hand, bandpass filters having center frequencies 40 Hz, 150 Hz, 400 Hz, 1 kHz, 2.4 kHz, 6 kHz, 10 kHz, and 15 kHz, and full-bandpass filters including all of these frequency bands, are independently provided for the R-channel and a left channel (L-channel) in a spectral display signal generator 32. Signals from the reproducing amplifier 20 in the R-channel and a reproducing amplifier (not shown) in the L-channel, and a control signal from the CPU 18 are supplied to the above spectral display signal generator 32. The spectral display signal generator 32 is constructed to accordingly band-divide the above signals and generate level display signals in accordance with the respective input levels, for each of the frequency bands.

Figure 8B:
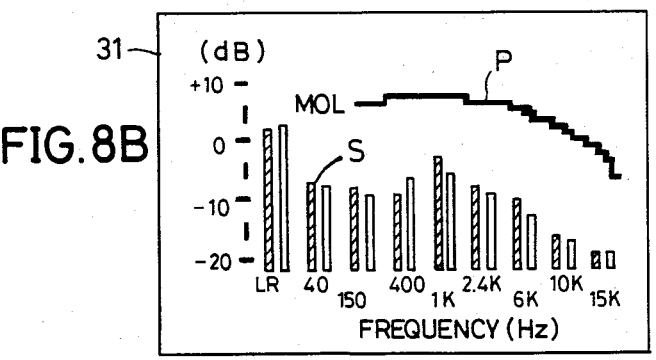

When spectral display is to be made with respect to the audio signal to be recorded, for example, the switching circuit 12 is switched over and connected to the side of the line amplifier, and the audio signal is recorded and reproduced independently for the R-channel and the L-channel. The signal from the reproducing amplifier 20 is converted into a spectral display signal at the spectral display signal generator 32 and stored in the RAM 29. Thereafter, the spectral display signal is obtained from the VDG 30 in synchronism with the vertical and horizontal synchronizing signals, and supplied to the display device 31. Accordingly, the levels of the input audio signal are displayed by bars S for each of the frequency bands together with the MOL curve P, as shown in FIG. 8B. The operator can thus adjust the level so that the level bar S of the audio signal to be recorded does not exceed the MOL curve P, and as a result, a most suitable recording can be carried out.

The signal for displaying the MOL curve P is stored into the RAM 29 during the above described test. Hence, the MOL curve P of the tape being used remains displayed on the display device 31 even after the testing signals $f_1$ through $f_4$ disappear. In addition, if the spectral display signal generator 32 is operated when the above MOL curve P is obtained, it is possible to display the testing signals $f_1$ through $f_4$.

Next, the relationship between the levels of the testing signals and the level deviation quantities will be observed. In FIG. 9, curves I and II respectively indicate the output level of the rectifier 64 shown in FIG. 4 when the tape is a metal tape and a ferrichrome tape. Further, curves III and IV respectively indicate the output level of the rectifier 60 shown in FIG. 4 when the tape is a metal tape and a ferrichrome tape.

As clearly seen from the curves III and IV shown in FIG. 9, the level deviation in the reproduced output at a part where the reproduced output level is large, is relatively small as shown in FIG. 10A. The level deviation in the reproduced output at a part where the reproduced output level is in the medium range, is in the medium range as shown in FIG. 10B. Moreover, the level deviation in the reproduced output at a part where the reproduced output level is small, is relatively large as shown in FIG. 10C.

A graph shown in FIG. 11 is obtained when the above relationship is described in terms of relationships between the distortion quantity (the distortion quantity increases as the level increases) and the testing signal level and the level deviation quantity. In FIG. 11, points (A), (B), and (C) respectively correspond to the reproduced outputs shown in FIGS. 10A, 10B, and 10C. Characteristics similar to those shown in FIGS. 9 through 11 are obtained regardless of the type of tape used.

As clearly understood from FIGS. 9 through 11, when obtaining the reproduced output level by use of the testing signal, the level deviation in the signal of large level is small compared to the level deviation in the signal of small level. Accordingly, when obtaining the 3% distortion by varying the level, instead of varying the level to a large level from a small level, a more accurate reproduced output comprising less level deviation can be obtained if the level is varied in steps of 1 dB to the small level from the large level, for example. The 3% distortion can be obtained within a shorter period of time by this method.

Figure 12:
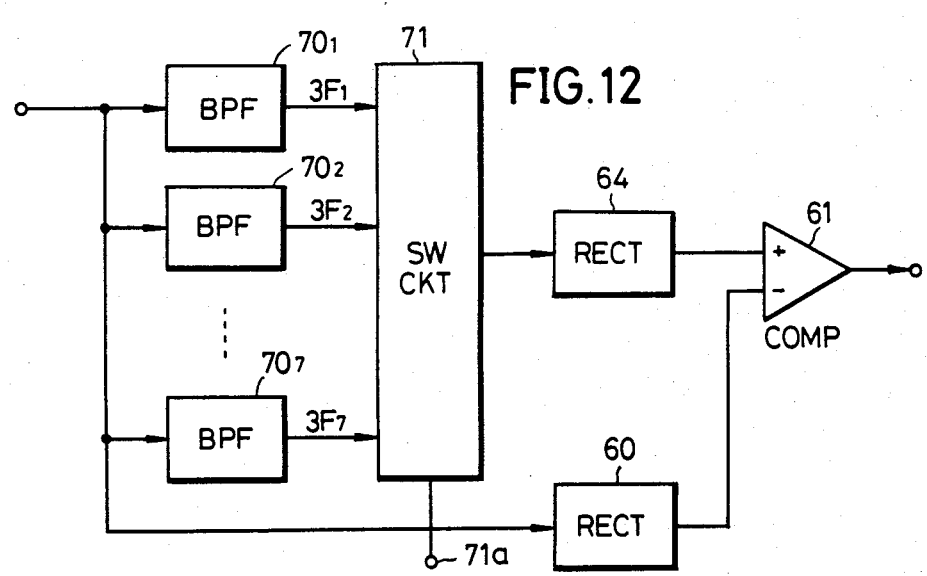
FIG. 12 is a systematic block diagram showing another embodiment of a 3% distortion detector in the tape recorder shown in FIG. 1.

If a more accurate MOL curve is to be obtained, a plurality of testing signals are set at frequencies under that of the first testing signal $f_1$ and at frequencies over that of the fourth testing signal $f_4$. For example, when testing by use of a testing signal having a frequency under that of the first testing signal $f_1$, a 3% distortion detector shown in FIG. 12 is employed. If the frequencies of the testing signals are designated by $F_1, F_2, \ldots, F_7$, bandpass filters $70_1, 70_2, \ldots, 70_7$ respectively having a gain of 30.5 dB are constructed to pass signals $3F_1, 3F_2, \ldots, 3F_7$. A switching circuit 71 switches over and produces the outputs of the bandpass filters $70_1, 70_2, \ldots, 70_7$, under control of a control signal applied to a terminal 71a from the CPU 18.

The output of any one of the bandpass filters $70_1$ through $70_7$ obtained from the switching circuit 71, is rectified at the rectifier 64, and supplied to one input terminal of the comparator 61. On the other hand, the rectified signal from the rectifier 60 is supplied to the other input terminal of the comparator 61. The signals thus supplied to the comparator 61 are compared, and a 3% distortion output is produced from the comparator 61 when the levels of these signals become equal.

Figure 13:
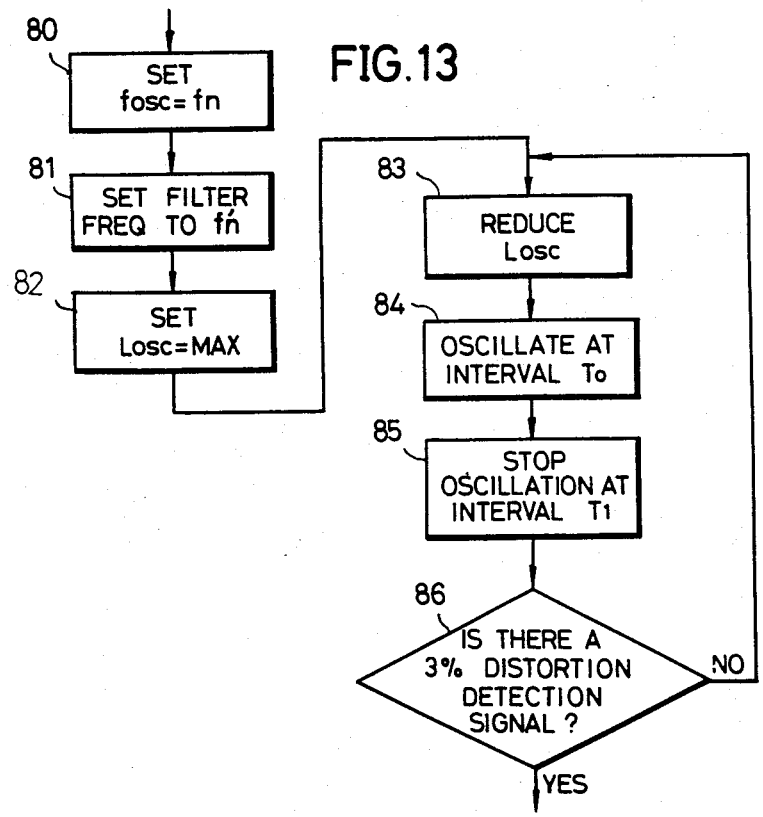
FIG. 13 is a flowchart for explaining the essential part of the operation of another embodiment of a MOL automatic measuring apparatus according to the present invention.

In this case, the CPU 18 sets the frequency of the testing signal to a predetermined frequency at a step 80, as shown in FIG. 13. The switching circuit 71 shown in FIG. 12 is controlled at a step 81, so that the output of a bandpass filter corresponding to the set testing signal is produced from the switching circuit 71. Next, the CPU 18 sets the level of the testing signal to a maximum at a step 82, and carries out control so that the level is gradually reduced at a step 83. After performing steps 84 and 85 which will be described hereinafter, the existence of the 3% distortion is detected at a step 86.

When using the 3% distortion detector 27 shown in FIG. 4, the CPU 18 carries out control at the steps 80, and 82 through 86 shown in FIG. 13.

As shown in FIG. 14(A), the testing signals $f_1$ through $f_4$ and $F_1$ through $F_7$ are obtained intermittently. These testing signals are recorded onto the tape during an interval $T_0$ (step 84), and reproduced from the tape during a stopping interval $T_1$ of the signal as shown in FIG. 14(B) (step 85). In this case, control is carried out so that the outputs of the two rectifiers in the 3% distortion detector shown in FIGS. 4 and 12 are held during the interval $T_1$. The signal reproduced from the tape is supplied to the A/D converter 28 shown in FIG. 1.

The A/D converter 28 has a construction shown in FIG. 15. A reproduced signal b shown in FIG. 14(B) which is applied to a terminal 28a, is rectified at a rectifier 90. A switch $SW_1$ is connected to a terminal ⓐ during an interval in which the reproduced signal b exists, and is connected to a terminal ⓑ during other intervals, according to a control signal obtained from the CPU 18. A signal from the rectifier 90 charges a capacitor $C_1$, through the switch $SW_1$ and an amplifier 91. The large level of the reproduced signal b (a signal $b_1$, for example) is held by the above capacitor $C_1$, and converted into a signal c shown in FIG. 14(C). This signal c is supplied to an inverting input terminal of a comparator 92. Detection of the 3% distortion or the maximum output is accordingly performed. When the level of the reproduced signal becomes less than a predetermined level at a time $t_1$, a control signal is obtained from the CPU 18, and a switch $SW_2$ is closed as shown in FIG. 14(F). Thus, the capacitor $C_1$ becomes discharged, and the level of the terminal voltage of this capacitor $C_1$ rises as shown in FIG. 14(C). Comparison is performed at the above comparator 92, between the level of the signal c and a threshold level $C_o$. As a result of this comparison, a signal d shown in FIG. 14(D) is obtained from the comparator 92 and supplied to the CPU 18. The CPU 18 measures the time between the closing time $t_1$ of the switch $SW_2$ and a time $t_2$ when the level of the signal d falls. Therefore, a digital signal in accordance with the reproduced signal $b_1$, that is, a digital signal in accordance with the reproduced maximum level of the testing signal, is obtained from the CPU 18.

By intermittently generating the testing signal as described above, the leakage of the recorded signal with respect to the reproduced signal can be prevented, when the apparatus according to the present invention is applied to an apparatus which carries out recording and reproduction by use of combination type head constituted by cores having the recording head 16 and the reproducing head 19 close together. However, it is known that the leakage is relatively small at low frequencies. Hence, it is not essential to intermittently generate the testing signal at low frequencies.

Figure 16:
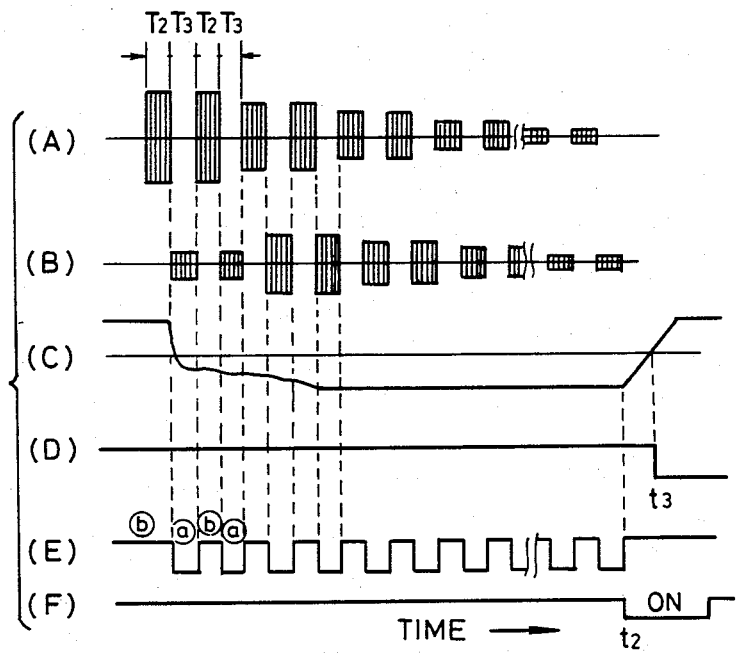
FIGS. 16(A) through 16(F) are graphs respectively showing signal waveforms for explaining the operation of the other embodiment of the apparatus according to the present invention.

Furthermore, an operation in which the testing signal is generated for an interval $T_2$ and stopped for an interval $T_3$ may be repeatedly performed twice as shown in FIG. 16(A). In this case, the recording and reproduction is carried out by intermittently reducing the level for each interval in which the above repeated operation is performed. FIG. 16(B) shows the signal waveform of the reproduced signal obtained by use of this method. The testing signal is recorded onto the tape during the interval $T_2$ at a step 101 shown in FIG. 17, and stopped of the oscillation during the interval $T_3$ at a step 102. The testing signal is agains recorded onto the tape during the interval $T_2$ at a step 103, and again stopped of the oscillation at a step 104. Reproduction is carried out during the interval $T_3$.

A signal shown in FIG. 16(C) held of the maximum level, is supplied to the inverting input terminal of the comparator 92 within the A/D converter 28 shown in FIG. 15. As in the embodiment described in conjunction with FIGS. 14(A) through 14(F), the above signal supplied to the comparator 92 is compared with a threshold level. Hence, a signal shown in FIG. 16(D) is obtained from the comparator 92. Similarly as in the above described embodiment, the time between the times $t_2$ and $t_3$ are measured as shown in FIGS. 16(D) and 16(F), and the analog-to-digital conversion is performed. The rest of the operation is the same as in the above embodiment described in conjunction with FIGS. 14(A) through 14(D).

This method is applied to a case where the distance between the recording head 16 and the reproducing head 19 along the direction of the tape travel is equal to 1.9 mm, for example, and narrow compared to that of the general head in which the distance is 3.8 mm, for example. The level can be detected positively without the possibility of dropout of the level detection, by generating the same level twice as described above.

Figure 19:
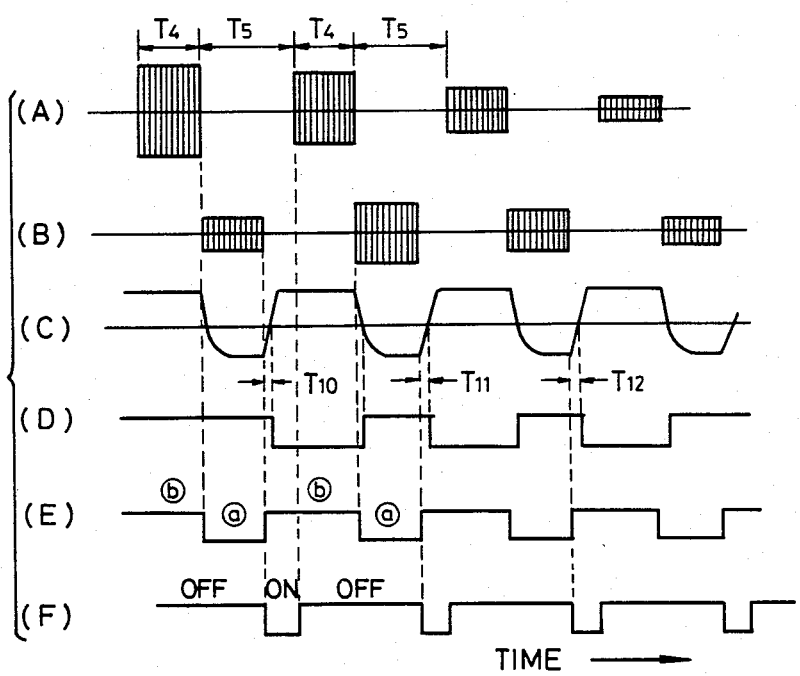
FIGS. 19(A) through 19(F) are graphs respectively showing signal waveforms for explaining the operation of the apparatus described in conjunction with FIG. 18.

FIG. 18 is a flowchart for explaining another embodiment of an apparatus according to the present invention. This other embodiment of the invention will now be described by referring to FIGS. 18, and 19(A) through 19(F). In this other embodiment, a generation interval $T_4$ of the testing signal is set small compared to a stopping interval $T_5$ as shown in FIG. 19(A). The analog-to-digital conversion is performed for every interval between completion of reproduction of the reproduced signal shown in FIG. 19(B) and generation of the next testing signal.

The switch $SW_1$ shown in FIG. 15 is controlled so that this switch $SW_1$ is connected to the terminal ⓐ during an interval in which the reproduced signal exists (steps 112, 116, . . . ), and connected to the terminal ⓑ during other intervals, as shown in FIG. 19(E). The switch $SW_2$ is controlled to close during an interval between a time when the reproduced signal disappears and a time when the recorded signal is generated (steps 113, 117, . . . ), and to open during other intervals, as shown in FIG. 19(F).

In FIG. 15, the voltage c at the inverting input terminal of the comparator 92 falls as the switch $SW_1$ is connected to the terminal ⓐ and rises as the switch $SW_1$ is connected to the terminal ⓑ (closing of the switch $SW_2$) as shown in FIG. 19(C). This voltage c and the threshold level are compared, and a signal shown in FIG. 19(D) is obtained from the comparator 92. The CPU 18 measures times $T_{10}, T_{11}, T_{12}, \ldots$ shown in FIG. 19(D) between the times when the switch $SW_2$ is turned ON and the times when the output signal of the comparator 92 falls to low level as shown in FIG. 19(D), at steps 113, 117, . . . . The measured time in the CPU 18 is renewed to the larger time among the measured times. The renewed measured time is the reproduced maximum of the testing signal to be obtained. The interval in which the voltage c is held is reduced by an interval corresponding to the interval $T_4$, because the analog-to-digital conversion is performed for every interval between completion of reproduction of the reproduced signal shown in FIG. 19(B) and generation of the next testing signal according to the present embodiment. Accordingly, the voltage c is not easily affected by external noise and the like, and the accuracy of the detection is improved.

Figure 20:
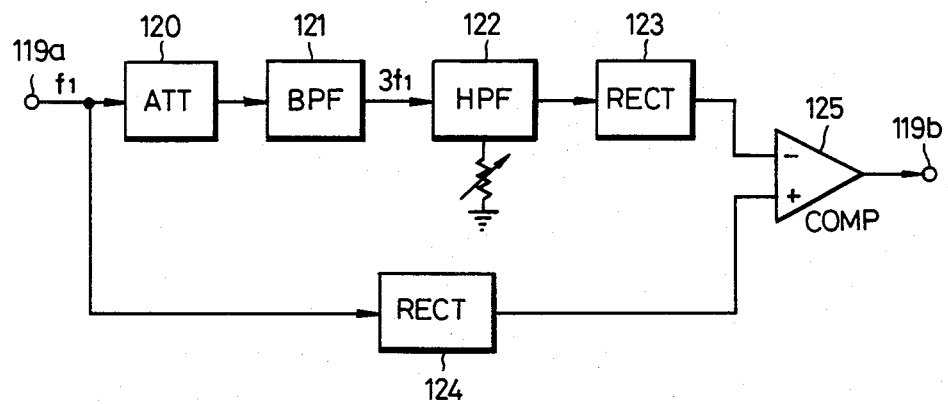
FIG. 20 is a systematic block diagram showing still another embodiment of a 3% distortion detector shown in FIG. 1.

A circuit shown in FIG. 20 may be used for the 3% distortion detector 27. In FIG. 20, the first testing signal $f_1$ applied to an input terminal 119a is attenuated of its level by 3% at an attenuator 120. An output of this attenuator 120 is supplied to a bandpass filter 121 having a gain of 20 dB at a center frequency 1 kHz, and thus converted into a third order harmonic component $3f_1$. This signal $3f_1$ is passed through a variable gain highpass filter 122 having a gain of 20 dB and set of the interrupting frequency at a frequency slightly higher than 1 kHz, and a rectifier 123. An output of the rectifier 123 is supplied to a comparator 125 together with the first testing signal $f_1$ from a rectifier 124. The highpass filter 122 substantially finely adjusts the center frequency of the bandpass filter 121. Because the rest of the operation is the same as that of the circuit shown in FIG. 4, description thereof will be omitted.

Figure 21:
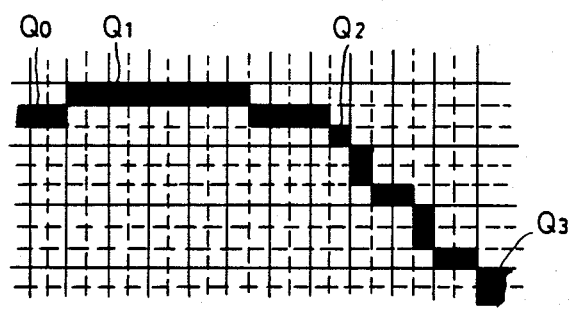
FIG. 21 is a diagram for explaining another embodiment of the display format for the MOL curve.

The MOL curve may be displayed on the display device 31 as shown in FIG. 21. Here, the MOL curve is displayed so that adjacent figures among figures $Q_0$ through $Q_3$ do not become continuous. Although the display may be irregular to the eye because the figures are discontinuous, the level can be observed with more accuracy by this method.

When performing the analog-to-digital conversion, an average may be obtained between the A/D conversion value at a point when the 3% distortion or the maximum output is detected and the A/D conversion value immediately prior to that point. By taking such an average, even if deviation is introduced in either one of the A/D conversion values, there is little effect of this deviation because the average is taken, and the detection can be performed with high accuracy.

In FIG. 1, the spectral display signal from the spectral display signal generator 32 and the MOL curve display signal from the VDG 30 may be added, to obtain a display at the display device 31 by composing these display signals.

The display signal may be obtained through the output terminal 34 and supplied to a video printer and the like, to record the display on a recording sheet to be kept.

The level of the testing signal may be reduced in steps of 0.75 dB or 0.5 dB, for example, instead of using the above step of 1 dB.

Furthermore, there is no attenuation of the analog value due to noise and the like, because data is obtained by subjecting each of the reproduced output level to the analog-to-digital conversion even during detection which lasts for a long period of time. Thus, the data can accurately be stored into the CPU 18.

Moreover, the frequency of the first testing signal $f_1$ may be in the vicinity of 315 Hz besides the frequency 333 Hz. In this case, the center frequency of the bandpass filter within the 3% distortion detector is set to 945 Hz which is three times the frequency 315 Hz.

The switching of the mode among the recording mode, reproducing mode, testing mode, and the like, is performed by a control signal from a control circuit 33.

Further, the present invention is not limited to these embodiments, but various variations and modifications may be made without departing from the scope of the present invention.

What is claimed is:

1. A maximum output level automatic measuring apparatus comprising:
    testing signal generating means for generating a plurality of testing signals having different frequencies, by independently varying respective levels of the testing signals;
    recording and reproducing means for recording said plurality of testing signals from said testing signal generating means onto a magnetic recording medium, and reproducing the recorded testing signals;

level detecting means for detecting reproduced levels of said plurality of testing signals from said recording and reproducing means; and display means for displaying a maximum output level curve according to reproduced levels detected at said level detecting means, said level detecting means detecting that reproduced levels of said plurality of testing signals have reached predetermined values preset with respect to the respective testing signals, said display means comprising a display screen having a frequency axis and a level axis, and independently displaying the reproduced levels which reached the predetermined values detected by said level detecting means for each of the frequencies.

2. A maximum output level automatic measuring apparatus as claimed in claim 1 in which said testing signal generating means generates said plurality of testing signals having different frequencies, by independently and gradually varying the respective level to low level from high level.

3. A maximum output level automatic measuring apparatus as claimed in claim 1 in which said testing signal generating means generates said plurality of testing signals by varying the respective level to low level from high level in steps.

4. A maximum output level automatic measuring apparatus as claimed in claim 1 in which said testing signal generating means generates said plurality of testing signals having different frequencies, by independently and intermittently varying the respective level.

5. A maximum output level automatic measuring apparatus as claimed in claim 1 in which said testing signal generating means interrupts generation of the testing signals during a period in which said recording and reproducing means is reproducing the testing signals, and said level detecting means holds the output reproduced signal during an interval in which said testing signals are generated.

6. A maximum output level automatic measuring apparatus as claimed in claim 1 in which said testing signal generating means interrupts generation of the testing signals during a period in which said recording and reproducing means is reproducing the testing signals, and said level detecting means obtains data by subjecting the reproduced levels of the testing signals which have reached said predetermined values, every time said testing signals are reproduced.

7. A maximum output level automatic measuring apparatus as claimed in claim 1 in which said testing signal generating means generates testing signals having frequencies 333 Hz and 6.3 kHz (and over 6.3 kHz), and said level detecting means detects a level with respect to said testing signal of 333 Hz whereat a 3% distortion is introduced in the reproduced level, and detects a maximum value of the reproduced level with respect to said testing signal of 6.3 kHz (and testing signals of over 6.3 kHz).

8. A maximum output level automatic measuring apparatus as claimed in claim 7 in which said level detecting means which detects the 3% reproduced level of said testing signal having the frequency 333 Hz comprises a filter for obtaining a third order harmonic of said testing signal having the frequency 333 Hz, an amplifier for amplifying an output of said filter by a predetermined quantity, and a comparator for comparing an output level of said amplifier and the level of said testing signal having the frequency 333 Hz.

9. A maximum output level automatic measuring apparatus as claimed in claim 1 in which said level detecting means obtains an average of a level at a point when it is detected that said predetermined value has been reached and a level immediately prior to that point.

10. A maximum output level automatic measuring apparatus as claimed in claim 1 in which said display means is stored with sectioned figures of said maximum output level curve to be displayed on said display screen, and displays the stored maximum output level curve by combining the figures of the maximum output level curve according to the signal from said level detecting means.

11. A maximum output level automatic measuring apparatus as claimed in claim 1 which further comprises spectral display signal producing means for independently producing the signals reproduced by said recording and reproducing means for each of the divided differing frequency bands, and said display means displaying spectral bars by signals produced from said spectral display signal producing means, and independently displaying reproduced levels which have reached said predetermined values and detected by said level detecting means and the signals produced from said spectral display signal producing means, for each of the frequencies.

* * * * *